June 27, 1939.  J. V. DYRR  2,164,204
INTERGEARED OFFSET DISK HARROW
Filed Nov. 20, 1934  3 Sheets-Sheet 1
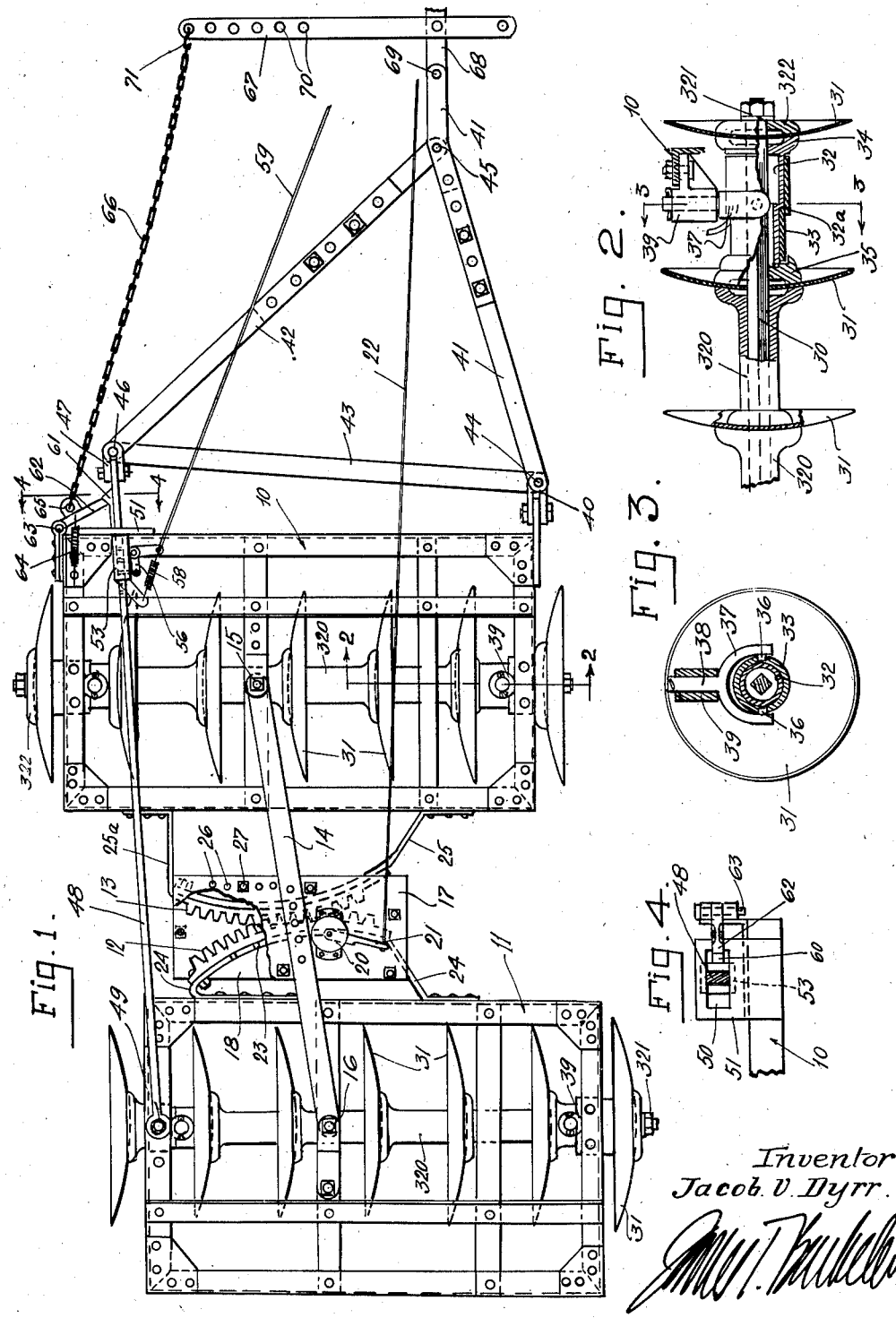
Inventor.
Jacob V. Dyrr.
Attorney.

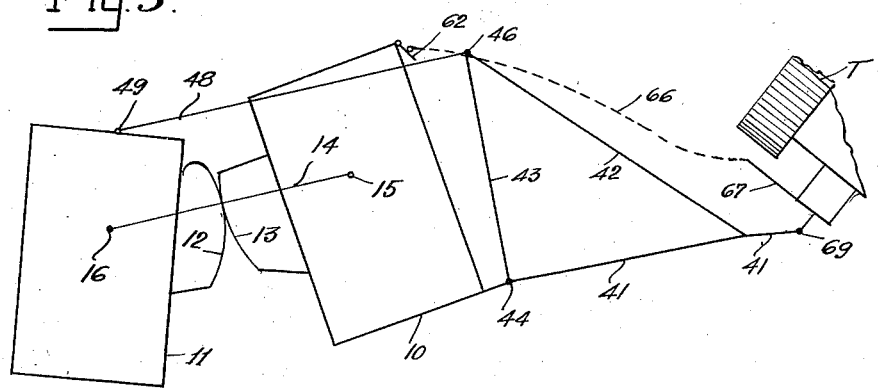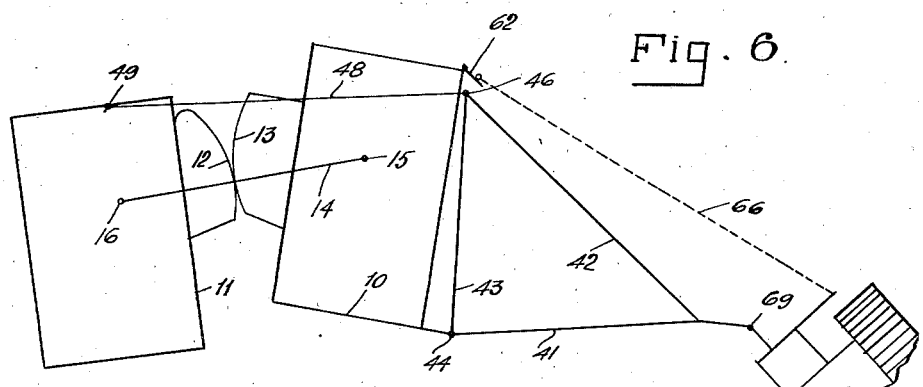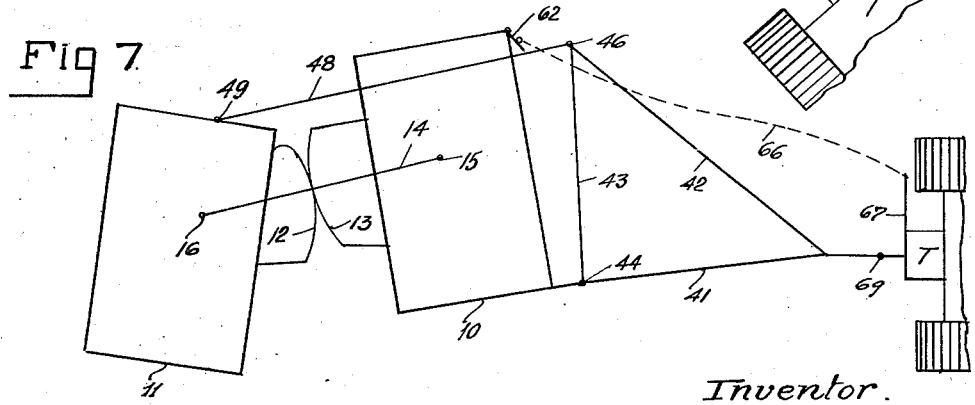

June 27, 1939.  J. V. DYRR  2,164,204
INTERGEARED OFFSET DISK HARROW
Filed Nov. 20, 1934  3 Sheets—Sheet 3
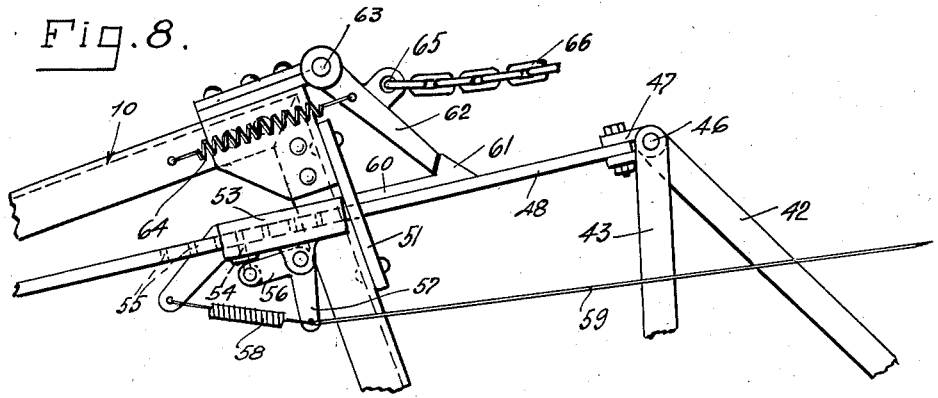
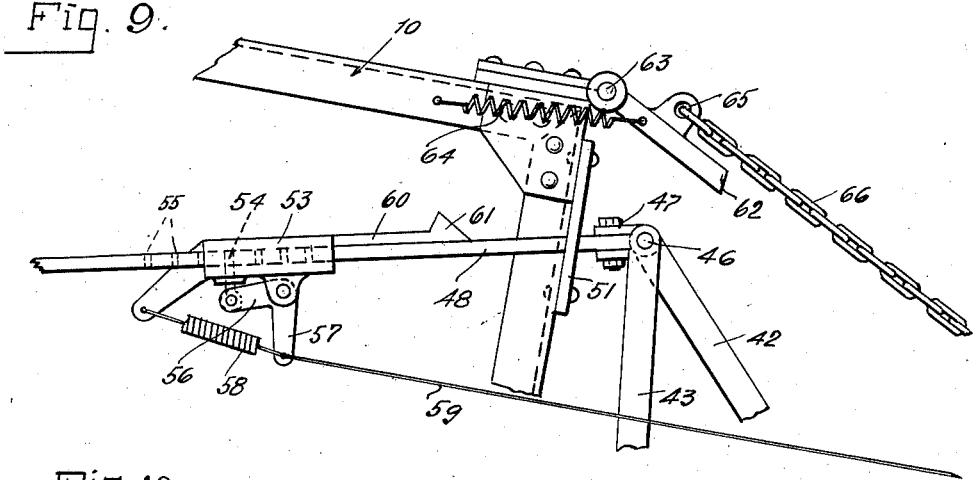
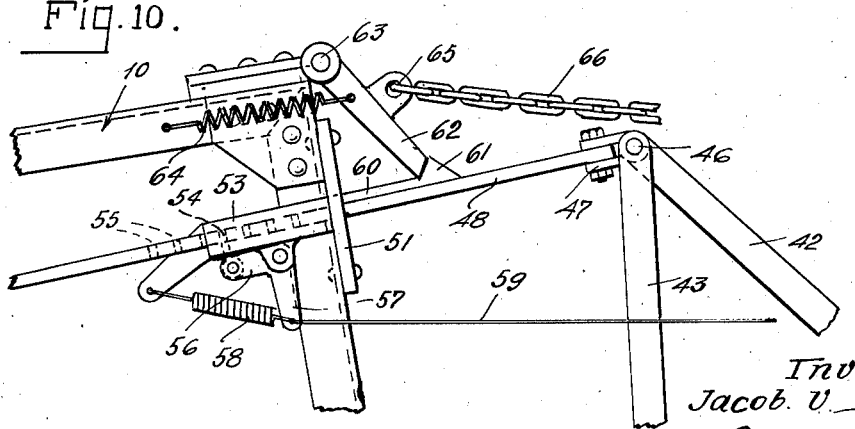
Inventor.
Jacob. V. Dyrr.
Attorney.

Patented June 27, 1939

REISSUED
DEC 3 1940

2,164,204

UNITED STATES PATENT OFFICE 2,164,204

INTERGEARED OFFSET DISK HARROW

Jacob V. Dyrr, Bell, Calif., assignor to International Harvester Company, Chicago, Ill., a corporation of New Jersey Application November 20, 1934, Serial No. 753,877

7 Claims. (Cl. 55—83)

This invention has to do with the type of ground working implement that is shown in my issued Patents 1,916,720 and 1,916,721, dated July 4, 1933; and the general object of the invention is to provide, for that general type of device, an improved arrangement and means for angling, and controlling the angling of, the plurality of gangs which are characteristic of this type of device.

In, for instance, my prior Patent 1,916,721 I have shown a harrow comprising two gangs of disks, intercoupled to swing or angle relative to each other, and so coupled to draft means that the draft, in cooperation with the soil drag, tends to angle the gangs. In the arrangement there shown, the draft means is coupled to the forward gang at one side, and to the rear gang at the other side; and the two gangs are intergeared so that angling of one gang tends also to angle the other. For positively angling the gangs into certain positions, for instance, for a right hand turn, and for controlling the anglings in that and certain other positions, I have provided a control line which, being attached to the tractor at an offset point at one side, is connected to the rear gang at the opposite side, and at the side of that rear gang opposite to that at which the draft is coupled to the rear gang.

In my present arrangement I couple such a control line to the forward gang rather than to the rear gang, and at the same side of the forward gang as that at which the draft is coupled to the rear gang. And also, in coupling such control line to the forward gang I provide a means whereby, under the control and operation of this control line, the rear gang's draft connection may be locked in various positions relative to the front gang; and thus I provide in a simple and effective arrangement not only an angling and angling control line going directly to the front gang, but also a gang locking means actuated automatically by such control line.

The invention will be better understood from a consideration of an illustrative and preferred form of embodiment set out in the following description and in the accompanying drawings in which:

Fig. 1 is a plan showing a typical two gang disk harrow equipped with my present improvements;

Figs. 2, 3 and 4 are sectional details on lines 2—2, 3—3 and 4—4, respectively of Figs. 1, 2 and 1;

Figs. 5, 6 and 7 are diagrams illustrating typical positions assumed by the harrow in operation;

Figs. 8, 9 and 10 are enlarged details showing positions of the control and locking devices corresponding respectively to the positions of Figs. 5, 6 and 7.

Referring first in a general way to Figs. 1, I show there a two-gang disk harrow of the same general type as shown in my Patent 1,916,721, including a forward gang of disks with a gang frame 10 and a rear gang of disks with a gang frame 11. These two gangs are interconnected so that they may swing relative to each other, and preferably, as in my former patents, I intergear the two gangs by means of meshing gear segments 12 and 13 which are mounted respectively on the two gang frames, and by a radius bar 14 pivoted to the two frames at 15 and 16 at the centers of the two gear segments. Gear confining plates 17 and 18, above and below the gears, are mounted on and carried by the radius bar 14; and a locking mechanism, generally designated by the numeral 20 and operated by handle 21 and pull cord 22, is mounted upon the upper plate 17 to lock into notches such as 23 provided in the bracket 24 that carries the rear gear segment on the rear gang frame 11. The details of this locking mechanism need not here be explained as they are explained fully in my Patent 1,916,721, to which reference is hereby made.

Such a locking device may be used for locking, and for limiting the relative anglings of the gang, in connection with the locking control devices which are hereinafter explained, or those hereinafter explained may be used solely and without the control and locking device 20. Also, for limiting the anglings of the gangs in certain positions I may further use another arrangement shown in my said prior patent. It will be understood plates 17 and 18, being carried by radius bar 14, move relative to the gear segments and to the brackets 24 and 25 which carry them. The plates may thus be provided with holes 26 into which a pin 27 may be dropped; and that pin, in such angling positions as shown in Fig. 5, will come into contact with bracket portion 25a and thus operate as another limit to gang angling.

In Figs. 2 and 3 I show my present preferred form of bearing and bearing mounting for the disk shafts. The disk shaft 30 as shown is square, the disks 31 fitting the square shaft. Fitted upon the square shaft is a bearing sleeve 32, having a stepped cylindric exterior bearing surface which fits in the bearing block 33. A flange 34 at the larger end of the bearing sleeve bears against a disk 31. Another flange 35, fitted on the smaller end of the bearing sleeve fits the shaft and bears endwise against the next disk 31.

End thrust is taken at the step shoulder 32a of the bearing sleeve. The bearing sleeve 32, with its flange 34 and flange disk 35 is thus a spacer between two adjacent disks. The bearing sleeve 32 is cored out, and fits the shaft only at its flanged end 34. At its smaller end it fits into flange plate 35, which fits the shaft.

Bearing block 33 is pivotally supported by horizontal trunnions 36 in a yoke 37, and the yoke has a vertical pin 38 that has bearing in a bearing bracket 39 secured to the gang frame. By such a bearing structure the disk shafts are mounted in universally movable bearings, which prevents all binding which might otherwise be due to either inaccuracies of workmanship or bending or warping of the frame and other parts. The structure lends itself very readily to construction not requiring great accuracy, and is very much conducive to long life and low friction of the bearings.

Between other adjacent disks 31, spacer sleeves 320 are fitted on the shaft; and the whole shaft-disk assembly is held together by being endwise confined, as by nut 321 and washer 322 at the shaft end. Such nut and washer may be used at both shaft ends, or at one end of the shaft the confining shoulder may be a permanent head.

In such harrows as I am here describing, the arrangement is usually such that the harrow trails the tractor in an offset position, the disks of the front gang usually being concave toward the right and those of the rear gang concave toward the left. For the purposes of simplicity in this description I shall therefore describe the draft and angling control devices as they are in practice applied to the gangs at right and left, respectively, but without necessary limitation of the invention to those relative transverse directions. I may also note that the intergearing of the two gangs is preferably somewhat to the left of the center of the gangs, and that the gear section 12 of the rear gang preferably is of smaller radius than gear 13 of the forward gang, so as to cause the angling movement of the rear gang to angle the forward gang, rather than vice versa. I will thus proceed to describe the draft and angling devices, using the terms "right" and "left" as they appear to an observer standing behind the harrow and facing forward toward the tractor.

The draft is coupled to the forward gang at the right hand front corner, through a universally flexible clevis 40. The draft frame is made up of a primary draft bar 41, adjustable in length; a secondary draft bar 42 also adjustable in length; and a spreader bar 43. Bars 41 and 43 are pivoted together at 44 to the draft clevis 40, bar 42 is pivotally connected at 45 to the forward end portion of bar 41; and the two bars 42 and 43 are connected together at the pivot 46 where coupling is made to the universal clevis 47 to which the rear gang draft bar 48 is connected. This draft bar 48 connects pivotally, that is flexibly, at 49 with the left hand side of the rear gang frame.

Draft bar 48 passes through a slot 50 in a vertical plate 51 mounted on the front of the forward gang frame 10. Bar 48 may preferably be rectangular in cross section, and the slot 50 is of such size as to freely pass the rod and to allow for its transverse change of position relative to the front frame. Plate 51, in addition to being a guide for bar 48, performs the office of a stop which limits the rearward movement of bar 48 in positions similar to that shown in Figs. 6 and 9. In a position just beyond that shown in these figures the clevis 47 will move back against plate 51 and thus may act to limit angling positions such as are shown in Fig. 6.

Slidable on bar 48 behind plate 51 is a lock block 53. This block is preferably tubular in form, large enough that it cannot pass through the plate slot 50, and it carries a locking pin 54 adapted to enter any one of a number of longitudinally spaced holes 55 in bar 48. This pin 54 is carried by arm 56 of a small bell crank lever pivoted on the lock block, the other arm 57 of the lever having a spring 58 and a pull cord 59 connected to it. Pull cord 59 extends forward to the tractor to be within easy reach of the operator. Tension spring 58 is connected at its other end to the block 53, so that the spring always tends to move lock pin 54 into any hole 55 which comes into register.

Extending forwardly from lock block 53, and normally projecting forwardly through stop plate 51 is a latch tongue 60 having on its forward end a projecting latch lug 61. In the normal position of the lock block and the latch, the lug 61 is engaged from behind by a latch pawl 62 pivoted at 63 on the left hand side or end of frame 10. This pawl is normally moved into position to engage behind the latch lug by a spring 64; and, as will readily be seen from Fig. 8, for instance, the latch pawl engages behind lug 61 when block 53 is in its forward position against plate 51. Thus, in such a position of the parts, if the block 53 is then locked by pin 54 to bar 48, the bar 48 is held immovable relative to the front gang and consequently the two gangs are relatively locked against changes of angle. Retraction of pin 54 by pulling on line 59 will at any time release bar 48 from the lock block and allow the gangs to change angle.

Latch pawl 62 has an eye 65 to which the rear end of the angling and control member 66 is attached. This member, here shown as a chain, has its forward end attached to a member 67 of the draft bracket which is mounted on the tractor T. This draft bracket may be made up in any suitable manner to provide for coupling member 66 at a laterally offset point. As shown in the drawings, the draft bracket may be made up of a draft member or drawbar 68, to which the draft bar 41 is pivotally, flexibly, attached at 69, preferably on the center line of the tractor. And the draft bracket may include the bracket member 67 which extends out to the left and has in it a plurality of spaced holes 70 to which the forward end of chain 66 may be selectively connected, as by and S-hook 71 which may be hooked into any hole and hooked into any chain link. The length of member 66 thus may be made adjustable, as also the lateral offset of its coupling to the tractor.

Fig. 1 shows the implement in the position used when being transported without doing any work. In this position the gangs are substantially parallel and the planes of the disks are substantially directly fore and aft, so that they will not dig into the surface on which they roll. The gangs are locked in this position by the lock block and latch, as will be readily understood from Fig. 1. In this position, with the tractor pulling substantially straight ahead, control chain 66 is slack as is indicated in Fig. 1.

When it is desired to put the implement to work, lock block 53 is released by pulling on cord 59, and the two gangs then automatically take such a working position as shown in Fig. 7. In taking this position the left hand end of forward gang 10 moves relatively rearwardly, and carries the block 53 rearwardly along draft bar 48. When the parts have reached such a working position as shown in Figs. 7 and 10, the slack in chain 66 has not been sufficiently taken up to pull latch pawl 62 out of engagement with lug 61; the lock block still remains locked to the front frame although bar 48 has been released. In this working position the control chain may be nearly taut, but the pawl 62 still holds lug 61, and consequently block 53 is still held up against stop plate 51. Consequently, after the gangs have reached their working angle, release of cord 59 will allow pin 54 to enter a hole 55 in draft bar 48 and thus lock the gangs in their angled working positions.

When the tractor makes a turn to the right chain 66 is pulled taut, and latch pawl 62 is immediately pulled out to the relative position shown in Figs. 6 and 9. This releases the left end of the forward gang from draft bar 48, and further forward pulling on chain 66 as the tractor turns to the right pulls the left end of the front gang forwardly until the parts have reached such a relative position as shown in Figs. 6 and 9. For this operation the lock block 53 need not be released from draft rod 48 and it may therefore travel relatively rearwardly with the rod 48 in such a position as shown in Fig. 9. With the gangs in the relative positions shown in Fig. 6, no lock is needed as long as the tractor continues to turn to the right; as, in this position, the gang angles are held by the combined actions of the draft means and the control chain 66.

In the position for right-hand turn explained in the last paragraph, the rear gang has moved up, relatively forwardly, on the forward gang. In the normal working position of Fig. 5 the rear gang is angled back, and the locking arrangements hold it in that relative angled position, angularly spaced from the front gang. When pawl 62 is withdrawn by the pull on chain 66, releasing lock block 53, the rear gang is then no longer held in angular spacing from the front gang, but can and does move forward and close up on the front gang.

If from the right hand turn position it is desired to go again into working position of Figs. 7 and 10, the block 53 which has not been disturbed in its position on rod 48 will automatically move forwardly to its position of Fig. 10, and chain 66 then being slack, pawl 62 will automatically re-engage the latch lug 61. If, on the other hand, block 53 has been released from rod 48 for any reason, a forward pull on cord 59 will always hold the locking pin 54 up and slide the block 53 forwardly along the rod until it reaches the position of Fig. 10 where pawl 62 can engage the lug. Release of cord 59 then engages the locking pin 54 to lock the parts in position.

On making a left-hand turn the rear gang 11 tends to drag behind and thus tends to increase its angle and also to increase the opposite angle of front gang 10. The result of these actions is relatively to move the left-hand end of the rear gang forwardly, and the left-hand end of the forward gang rearwardly, so the parts tend to take such a position as shown in Figs. 5 and 8. The selected point of tractor attachment of chain 66 is such that the left hand turning of the tractor will keep chain 66 slack, or increase its slack, as the left hand end of the forward gang drops relatively rearwardly.

The left hand turn can be, and usually is, made in the working position of Figs. 7 and 10. If, however, it is desired to increase the angles, either for working or left hand turning, it is only necessary to pull on cord 59.

In order to allow the increased angling of the gangs to such a position as shown in Figs. 5 and 8, the lock pin 54 is withdrawn by pulling on cord 59, which allows draft bar 48 to slide relatively forwardly through lock block 53; but the lock block is still held in position by pawl 62 engaging lug 61. When the gangs have reached a suitable left-hand turning position lock pin 54 may be released to again lock the block 53 to rod 48; and the gangs may thus be locked in a left hand turning position in which they will also effectively cultivate the soil.

I claim:

1. A tractor operated ground working implement comprising forward and rearward gangs of ground working tools, means interconnecting the gangs for relative angling movement in a horizontal plane, draft means flexibly connected to the tractor and to both gangs, being connected to the forward gang at one side of the gang interconnection and to the rearward gang at the other side of the interconnection, and an angling control member connected to the tractor at a point offset laterally from the point of draft connection thereto and directly to the forward gang at a point offset laterally to the last mentioned side of the gang interconnection.

2. A tractor operated ground working implement comprising forward and rearward gangs of ground working tools, means interconnecting the gangs for relative angling movement in a horizontal plane, draft means flexibly connected to the tractor and embodying draft members severally flexibly connected to the forward gang at one side of the gang interconnection and to the rear gang at the other side of the interconnection, the rear-gang-connected member being movable relative to the forward gang, an angling control member connected to the tractor at a point offset laterally from the point of draft connection thereto and to the forward gang at a point offset laterally to the last mentioned side of the gang interconnection, and stop means acting between the rear gang draft member and the forward gang and controlled by the control member.

3. A tractor operated ground working implement comprising forward and rearward gangs of ground working tools, means interconnecting the gangs for relative angling movement in a horizontal plane, draft means flexibly connected to the tractor and embodying draft members severally flexibly connected to the forward gang at one side of the gang interconnection and to the rear gang at the other side of the interconnection, the rear-gang-connected member being movable relative to the forward gang, an angling control member connected to the tractor at a point offset laterally from the point of draft connection thereto and to the forward gang at a point offset laterally to the last mentioned side of the gang interconnection, and means adapted to lock the rear gang draft member to the forward gang and controllable by hand and by the control member.

4. A tractor operated ground working implement comprising forward and rearward gangs of ground working tools, means interconnecting the gangs for relative angling movement in a horizontal plane, draft members flexibly connected to the tractor and to the forward gang at one side of the gang interconnection and to the rearward gang at the other side of the interconnection, the draft member connected to the rearward gang being movable relative to the forward gang, a control member connected to the tractor at a point laterally offset from the point of draft connection thereto and connected to the forward gang at the last mentioned side of the gang interconnection, and stop means acting between the rear gang draft member and the forward gang controllable by the control member.

5. A tractor operated ground working implement comprising forward and rearward gangs of ground working tools, means interconnecting the gangs for relative angling movement in a horizontal plane, draft members flexibly connected to the tractor and to the forward gang at one side of the gang interconnection and to the rearward gang at the other side of the interconnection, the draft member connected to the rearward gang being movable relative to the forward gang, a control member connected to the tractor at a point laterally offset from the point of draft connection thereto and connected to the forward gang at the last mentioned side of the gang interconnection, the draft member connected to the rearward gang including a draft bar, a lock block slidable on the bar, manually controlled means for locking the block to the bar, and means for locking the block to the forward gang and controlled by the control member.

6. A tractor operated ground working implement comprising forward and rearward gangs of ground working tools, means interconnecting the gangs for relative angling movement in a horizontal plane, draft members flexibly connected to the tractor and to the forward gang at one side of the gang interconnection and to the rearward gang at the other side of the interconnection, the draft member connected to the rearward gang including a draft bar movable relative to the forward gang, a latch pawl movably connected with the forward gang at the last mentioned side of the gang interconnection, a lock block slidable on said draft bar, manually controlled means to lock the block to said bar, means engageable by the pawl to hold the block against movement relative to the forward gang, and a control member connected to the tractor at a point laterally offset from the point of draft connection thereto and connected to the pawl to move it to release the block.

7. A tractor operated ground working implement comprising forward and rearward ground working tools flexibly connected with one another, draft means flexibly connected to the tractor and embodying draft members one of which is connected adjacent one end of the forward gang and the other of which is connected adjacent the other end of the rearward gang and passes over the forward gang adjacent the other end, an angling control member connected to the tractor at a point offset laterally from the point of draft connection thereto and to the forward gang at a point adjacent the portion over which passes the draft member connected to the rear gang, and stop means acting between the rear gang draft member and the forward gang and controlled by the control member.

JACOB V. DYRR.